Aug. 14, 1934.   J. H. DE BOER ET AL   1,970,496
CARRIER PROVIDED WITH A LIGHT SENSITIVE SUBSTANCE
AND PROCESS OF MANUFACTURING THE SAME
Filed Jan. 13, 1931

Inventors.
Jan Hendrik de Boer
Cornelis Johannes Dippel
By
Attorney.

Patented Aug. 14, 1934

1,970,496

UNITED STATES PATENT OFFICE 1,970,496

CARRIER PROVIDED WITH A LIGHT SENSITIVE SUBSTANCE AND PROCESS OF MANUFACTURING THE SAME

Jan Hendrik de Boer and Cornelis Johannes Dippel, Eindhoven, Netherlands, assignors to N. V. Philips' Gloeilampenfabrieken, Eindhoven, Netherlands Application January 13, 1931, Serial No. 508,528
In the Netherlands March 22, 1930

10 Claims. (Cl. 95—7)

The invention relates to carriers provided with a light-sensitive substance, processes of manufacturing such carriers and processes of producing photographic images.

Carriers provided with a light-sensitive substance are manufactured, as a rule, by applying light-sensitive substances in the form of emulsions to carriers, for example to plates or films. Frequently use is also made of the impregnation of carriers such as paper, with solutions of light-sensitive substances.

According to the invention, the light-sensitive substance is applied to a carrier by causing it to deposit thereon from the vapor phase.

The invention will be more fully explained with reference to the accompanying drawing.

Figure 1:
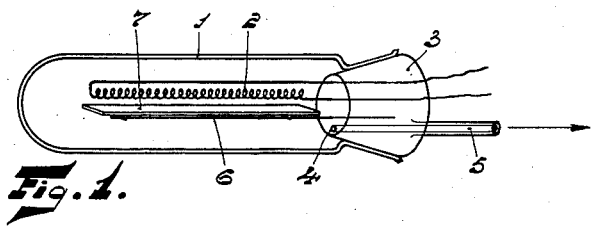
Figure 2:
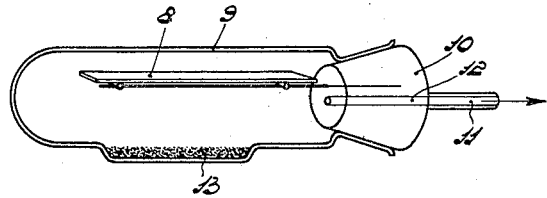

In the drawing, Fig. 1 is a view of apparatus for carrying out the processes of the invention and Fig. 2 is a similar view of a modified form of apparatus.

Referring to Figure 1, a glass vessel 1 can be closed by a ground stopper 3 provided with a bore 4 which is continued in an extension 5. The ground stopper 3 carries a supporting plate 6 and an incandescible body 2, the latter being provided with the substance to be applied, for example by sublimation, to the glass plate 7 bearing on the supporting plate 6. Silver bromide is particularly suitable for this purpose. The silver bromide may be applied to the incandescible body by squirting thereon a suspension of silver bromide in alcohol or by immersing the incandescible body into molten silver bromide. By means of the extension 5 the device is connected to a vacuum pump (not shown). After the vessel 1 has been exhausted and the incandescible body has been heated by an electric current during a short time, for example for some seconds, to about 700 to 800° C., a sufficient quantity of silver bromide will have been applied by sublimation to the plate. The time of glowing required for obtaining a suitable layer, depends on the temperature of the heated member or body 2, on the quantity of the substance to be volatilized, on the surface area of the plate 7, etc. The layer preferably has a thickness from $0.1\mu$ to $100\mu$.

The other silver halides, in general volatilizable light-sensitive combinations, are also suitable for use. According to a particular mode of realization of the invention, the carrier may be first provided with an adsorbent to which the light-sensitive substance may be caused to adsorb from the vapor phase. Very favorable results can be obtained if the adsorbent is caused to deposit from the vapor phase on the said carrier. One may proceed, for example as follows: With the aid of the device above described, a plate is made on which calcium fluoride is deposited. Subsequently, this plate 8 is introduced into a vessel 9 on the bottom 13 of which is provided thallous iodide and which can be exhausted (Fig. 2). The vessel 9, which may be of glass, is closed by a ground glass stopper 10 provided with a connecting piece 11 leading to a vacuum pump and a bore 12. After the vessel 9 has been exhausted, the entire device is brought to about 200–300° C. At this temperature, thallous iodide vapor is produced, of which a quantity is adsorbed by the calcium fluoride of the plate 8 located in the vapor space of the vessel 9, a carrier provided with a light-sensitive layer being thus obtained.

It is evident from the above that, with the above process, carriers provided with a light-sensitive substance can be obtained which contain no binder such as gelatin.

The invention further relates to a process of producing photographic images, in which use is made of the above-described carrier provided with a light-sensitive substance. Such carriers are also suitable for use in reproducing processes.

What we claim is:

1. Photographic material comprising a carrier provided with a photochemically sensitive metal salt which has been deposited thereon from the vapor phase.

2. Photographic material as claimed in claim 1, in which the photochemically sensitive metal salt is adsorbed from the vapor phase to an adsorbent layer applied to the carrier.

3. Photographic material comprising a carrier provided with an adsorbent layer deposited thereon from the vapor phase, and with a photochemically sensitive metal salt deposited thereon from the vapor phase and adsorbed by said layer.

4. A carrier provided with a light-sensitive metal salt for making photographic images, said metal salt being deposited thereon from the vapor phase.

5. Photographic material comprising a carrier provided with a photochemically sensitive silver salt which has been deposited thereon from its vapor phase.

6. The process of manufacturing photographic material comprising the step of coating a carrier with a layer of a photochemically sensitive metal salt by sublimation.

7. The process of manufacturing photographic material comprising the steps of coating a carrier with an adsorbent, and depositing on said adsorbent from its vapor phase a photochemically sensitive metal salt by causing said metal salt to be adsorbed by said adsorbent.

8. The process of manufacturing photographic material comprising the steps of depositing from the vapor phase an adsorbent layer on a carrier, and causing said layer to adsorb from its vapor phase a photochemically sensitive metal salt.

9. The process of manufacturing a carrier provided with a light-sensitive metal salt for making photographic images comprising the step of subliming the light-sensitive metal salt upon the carrier.

10. The process of manufacturing a carrier provided with a light-sensitive substance for making photographic images comprising the step of subliming a volatilizable silver halide upon the carrier.

JAN HENDRIK DE BOER.
CORNELIS JOHANNES DIPPEL.